(No Model.)

C. K. MARSHALL.
SADDLE.

No. 426,032. Patented Apr. 22, 1890.

Witnesses:
J. P. Theo. Lang.
E. T. Fenwick

Inventor:
Chas. K. Marshall
by his attys
Mason, Fenwick & Lawrence

UNITED STATES PATENT OFFICE.

CHARLES K. MARSHALL, OF VICKSBURG, MISSISSIPPI.

SADDLE.

SPECIFICATION forming part of Letters Patent No. 426,032, dated April 22, 1890.

Application filed July 9, 1889. Serial No. 316,961. (No model.)

*To all whom it may concern:*

Be it known that I, CHARLES K. MARSHALL, a citizen of the United States, residing at Vicksburg, in the county of Warren and State of Mississippi, have invented certain new and useful Improvements in Saddles; and I do hereby declare the following to be a full, clear, and exact description of the invention, such as will enable others skilled in the art to which it appertains to make and use the same.

The object of my invention is the production of a saddle for riding horseback, as an improved manufacture, which shall possess the merit of cheapness, durability, and lightness; which shall not be affected by change of temperature and constantly retain a smooth non-absorbing surface and not heat the flesh of the animal at the points of contacts when in use, thereby avoiding wind-galls and sores due to surface chafing; which shall possess rigidity sufficient to always retain its normal shape; which cannot be destroyed by vermin, and which can be thoroughly washed without injury; and my invention consists in a novel construction of a saddle, the same being produced from wood-fiber pulp, indurated, waterproofed, and solidified throughout the body of the saddle formed of it, and baked, so as not to be liable to soften under the influences of solar heat and moisture.

My invention consists, second, in a novel construction of a saddle, the same combining metal strengthening-supports and wood-fiber pulp, indurated, waterproofed, and solidified throughout the body of the saddle formed of it, and vulcanized or baked, so as not to be liable to soften or change its form under the influences of solar heat or moisture.

Figure 1:
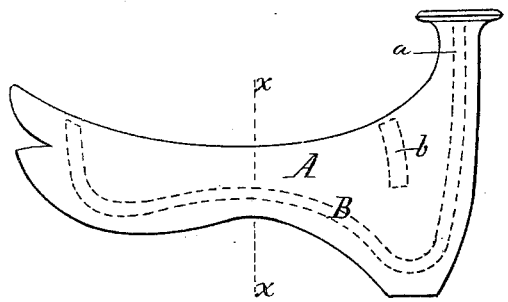
Figure 2:
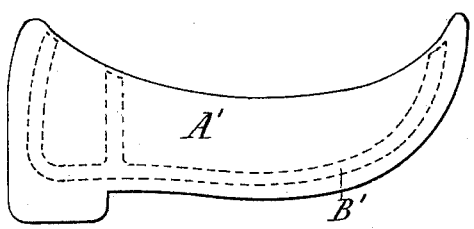
Figure 3:
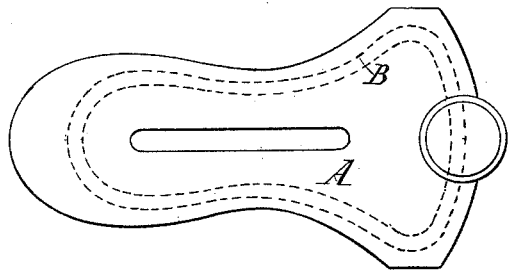
Figure 4:
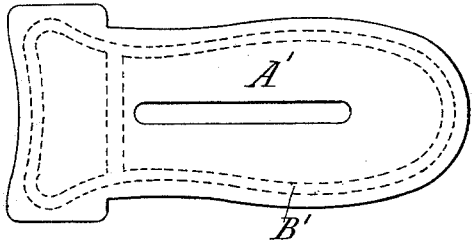
Figure 5:
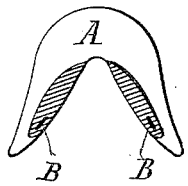
Figure 7:
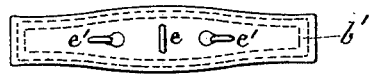
Figure 8:
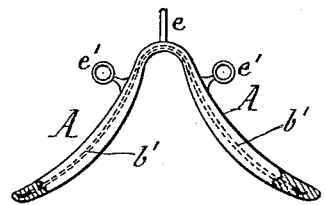
Figure 6:
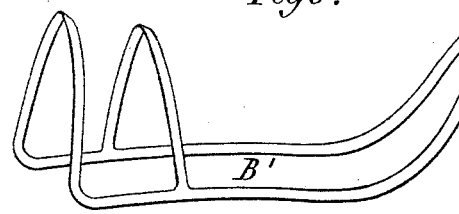

In the drawings, Figure 1 represents in elevation a saddle having a high pommel and known as the "Mexican" style, while Fig. 2 shows in elevation a saddle in more general use for horseback riding. Fig. 3 is a plan view of Fig. 1, and Fig. 4 is a plan view of Fig. 2. Fig. 5 is a cross-section in the line *x x* of Fig. 1. Fig. 7 is a plan view of a harness-saddle, of which Fig. 8 is a view in elevation. Fig. 6 shows in perspective elevation a metal skeleton frame which constitutes an interior strengthening adjunct of the saddle delineated in Figs. 2 and 4, while in Figs. 1 and 2 are shown in dotted lines an analogous frame, and for the same purpose; and in all of these figures the main or body portion of the saddles represented are made of wood-fiber pulp, indurated, waterproofed, and solidified throughout the body of the saddle formed of it, and baked under a high degree of heat—say from 200° to 300°—whereby they are rendered susceptible of high polish, very durable, and made to possess the other qualities hereinbefore stated.

In Figs. 1 and 3 I have shown a saddle-body A, having a high pommel *a*, every part of which is composed of the prepared wood-fiber pulp, and which, in a properly formed mold, has been made to surround or practically inclose a metal skeleton frame B, (shown in dotted lines in said figures,) as well as an additional metal strengthening-bar *b* in rear of the pommel *a*.

In Figs. 2 and 3 I have shown the body portion A' of the saddle delineated as having within the pulp which composes its body A' a metal skeleton frame B', (clearly shown in Fig. 6,) and in each of these saddles, as in Figs. 1 and 2, the metal skeleton supporting-frames are made to correspond with the conformation of the parts of the body of the saddle which has been molded around them. The metal supporting-frames B and B' thus act to strengthen the saddle and maintain against all violence in use its general normal configuration.

In carrying out my invention I reduce wood to a finely-divided or fibrous condition by any of the well-known methods practiced in the manufacture of paper-pulp. Add to the wood-fiber pulp a proper coloring-matter, as well as the proper quantity of waterproofing, binding, and indurating material—say, for example, glue, shellac, rubber, and bichromate of potash or chloride of zinc in suitable proportions. The coloring-matter for a brownish saddle may consist of analine brown, and for a black saddle a composition of copperas and logwood may be used. The india-rubber, which is used for preventing brittleness, imparting toughness, and strengthening and binding the fibers compactly together and rendering the same water-proof, may be the india-rubber gum of commerce, as may be also the glue and shellac which are used for giving adhesiveness, aiding in solidifying and waterproofing the compounds. The glue and shellac united are less liable to be affected by moisture. The bichromate of potash is used to fix the colors and maintain them uniform as long as the saddle lasts. The chloride of zinc is used to harden the compound, it almost petrifying the whole mass, while helping to give a smooth surface. The above substances in proper proportions being brought to a condition for uniting with one another are thoroughly mixed together and the pulp so strained of its water or other liquid as to render it sluggishly fluent. I then within any properly-constructed metal mold having suitable passages for the escape of water from the pulp during the molding and forming of the saddle adjust the skeleton supporting-frame, whether B or B', as the case may be, so that the prepared pulp may be flowed or forced or tamped into the mold through one or more proper openings and within its matrix be made to form the body A or A' of the saddle, as the case may be, all around said metal frame B B' or other metal strengthening parts, as $b$. This having been done and the molded saddle having become sufficiently set and deprived of moisture, is then baked with a heat ranging, say, from 200° to 300°, or to such a degree that it is not liable to become softened under the influence of solar heat and moisture, and the finished saddle may have such saddle-cloths and housings appropriately fastened to them as may be desired for an attractive dress.

Saddles thus formed of the described fibrous pulp admit of a high polish of their bodies A A' and possess all the qualities essential to a good saddle, such desirable qualities having been unattainable heretofore owing to the inadequate state of the art in the due treatment of the pulp for the purpose of forming saddles therewith.

In Figs. 7 and 8 the dotted lines $b'$ indicate a metal skeleton frame within the body portion A of the harness-saddle represented, said body portion being made of pulp prepared as hereinbefore described and molded in an appropriate metal mold. In this case the check-rein-hook $e$ and the terrets $e'$ $e'$ are applied after removal from the mold.

As the pulp herein described, on account of its peculiar properties, is applicable to and useful in the manufacture of harness-saddles and horse-collars of the construction shown in my application for a patent for pulp horse-collars, Serial No. 316,960, its use in the manufacture of such saddles and horse-collars would be analogous to the use of the same in the manufacture of pulp riding-saddles and but an equivalent of the invention which I have devised.

Having thus described my invention, what I claim as new, and desire to secure by Letters Patent, is—

1. The improved article of manufacture, to wit: a saddle composed of a pulp compound consisting of wood fiber, india-rubber, bichromate of potash, glue, shellac, chloride of zinc, and suitable coloring-matter mixed in proper proportions and molded, formed, and baked, substantially as described.

2. The improved article of manufacture consisting of a molded, formed, and baked wood-fiber-pulp saddle strengthened by metallic appliances embedded in the pulp, said saddle being throughout its body water-proof, hard, and solid, and of a nature whereby, in conjunction with the strengthening and staying devices, it is rendered free from liability to change its form under usual strains and the influence of solar heat and moisture, substantially as described.

In testimony whereof I hereunto affix my signature in presence of two witnesses.

CHAS. K. MARSHALL.

Witnesses:
 J. P. THEODORE LANG,
 E. T. FENWICK.